United States Patent
Guiroult

(10) Patent No.: US 12,006,988 B2
(45) Date of Patent: Jun. 11, 2024

(54) TRANSMISSION GEAR BOX AND WHEELED VEHICLE PROVIDED WITH SUCH A TRANSMISSION GEAR BOX

(71) Applicant: FRANCE REDUCTEURS, Les Herbiers (FR)

(72) Inventor: Fabien Guiroult, Saint Hilaire le Vouhis (FR)

(73) Assignee: FRANCE REDUCTEURS, Les Herbiers (FR)

( * ) Notice: Subject to any disclaimer, the term of this patent is extended or adjusted under 35 U.S.C. 154(b) by 310 days.

(21) Appl. No.: 17/605,429

(22) PCT Filed: Mar. 16, 2020

(86) PCT No.: PCT/FR2020/050570
§ 371 (c)(1),
(2) Date: Oct. 21, 2021

(87) PCT Pub. No.: WO2020/217016
PCT Pub. Date: Oct. 29, 2020

(65) Prior Publication Data
US 2022/0186793 A1   Jun. 16, 2022

(30) Foreign Application Priority Data

Apr. 24, 2019   (FR) ..................................... 19 04288

(51) Int. Cl.
*F16D 41/18*   (2006.01)
*F16D 11/14*   (2006.01)
(Continued)

(52) U.S. Cl.
CPC ............ *F16D 41/185* (2013.01); *F16D 11/14* (2013.01); *F16D 41/16* (2013.01); *A01D 34/6812* (2013.01); *A01D 34/69* (2013.01)

(58) Field of Classification Search
CPC ........ F16D 41/185; F16D 11/14; F16D 41/16; F16D 34/6812; F16D 34/69
(Continued)

(56) References Cited

U.S. PATENT DOCUMENTS 4,796,737 A * 1/1989 Tyler ...................... F16D 11/10
  192/69.62
5,394,764 A * 3/1995 Fini, Jr. ................... F16H 3/145
  74/378

(Continued)

OTHER PUBLICATIONS

International Search Report dated Jul. 8, 2020.

*Primary Examiner* — Ha Dinh Ho
(74) *Attorney, Agent, or Firm* — IPSILON USA, LLP

(57) ABSTRACT

Transmission gear box (1) comprising, at least partially accommodated in the housing (1), an output shaft (6), a rotating drive member (5) mounted to rotate freely about the shaft (6), a system (2) for rotating the rotating drive member (5) in forward and reverse gear and, arranged between the shaft (6) and the rotating drive member (5), a clutch mechanism (3) having an engaged state and a disengaged state, wherein the shaft (6) is free to rotate in any of the directions of rotation thereof, the automatic clutch mechanism (3) being configured, in forward gear, to shift from the disengaged state to the engaged state by rotating in forward gear the motor member (5) when the speed of rotation of the rotating drive member (5) is higher than that of the shaft (6), and from the engaged state to the disengaged state by rotating in forward gear the shaft (6) when the speed of rotation of the shaft (6) is higher than the speed of rotation of the rotating drive member (5). The clutch mechanism (3, 4) is also automatic in reverse gear.

16 Claims, 22 Drawing Sheets

(51) Int. Cl.
*F16D 41/16* (2006.01)
*A01D 34/68* (2006.01)
*A01D 34/69* (2006.01)

(58) Field of Classification Search
USPC .................................................. 74/335, 362
See application file for complete search history.

(56) References Cited

U.S. PATENT DOCUMENTS

| | | | | |
|---|---|---|---|---|
| 5,551,338 A | * | 9/1996 | Wall | B41F 7/26 |
| | | | | 101/148 |
| 9,885,416 B2 | * | 2/2018 | Blanchard | F16H 59/02 |
| 2010/0307269 A1 | * | 12/2010 | Blanchard | F16H 61/16 |
| | | | | 74/376 |
| 2010/0307289 A1 | | 12/2010 | Blanchard | |
| 2016/0084361 A1 | | 3/2016 | Barendrecht | |

* cited by examiner

TRANSMISSION GEAR BOX AND WHEELED VEHICLE PROVIDED WITH SUCH A TRANSMISSION GEAR BOX

RELATED APPLICATION

This application is a National Phase of PCT/FR2020/050570 filed on Mar. 16, 2020, which claims the benefit of priority from French Patent Application No. 19 04288, filed on Apr. 24, 2019, the entirety of which are incorporated by reference.

FIELD OF THE INVENTION

The present invention relates to a transmission gearbox and to a wheeled vehicle equipped with such a transmission gearbox.

It relates more particularly to a transmission gearbox comprising, housed at least partially inside said box, a so-called output shaft made as a single piece or as at least two coaxial shaft sections, which are mounted free to rotate with respect to one another, a rotary drive member mounted free to rotate on said shaft, a drive system for rotationally driving said rotary drive member in a first, so-called forwards running, rotationally driven direction and in a second, so-called reverse-running, rotationally driven direction and, positioned between the shaft or each of the shaft sections and the rotary drive member, a clutch mechanism, the or each clutch mechanism having a disengaged state and an engaged state, the shaft or each shaft section being, when the corresponding clutch mechanism is in the disengaged state, free to rotate in either one of its directions of rotation, the or each so-called automatic clutch mechanism being configured so that, when the rotary drive member is rotationally driven in the first so-called forwards-running rotationally driven direction, said clutch passes from the disengaged state to the engaged state when the rotational speed of said rotary drive member is greater than that of the shaft or of said shaft section with which the clutch mechanism is intended to collaborate, and from the engaged state to the disengaged state by the rotational driving in forwards running of the shaft or of the shaft section with which the clutch mechanism collaborates, when the rotational speed of the shaft or of said shaft section is greater than the rotational speed of the rotary drive member.

DESCRIPTION OF RELATED ART

Such a transmission gearbox incorporates a so-called automatic clutch which does not, for its operation, require a dedicated control member, such as a fork, as is required in traditional clutches.

In such a transmission gearbox, as illustrated in patent FR 2 885 655, when the rotary drive member, such as a gearwheel, is rotationally driven in a so-called forwards running direction, the clutch mechanism is deactivated when the rotational speed of the shaft, which is generally the shaft that drives the wheels of the vehicle, is greater than the rotational speed of the driving gearwheel. This feature generally, because of the inertia of the vehicle, allows automatic deactivation of the clutch mechanism or mechanisms, when the vehicle is stopped. Specifically, when the vehicle is stopped, the driving gearwheel stops turning and the shaft or shaft sections that drive the wheels of the vehicle, and which are driven by the inertia of the vehicle, ensure deactivation of the clutch mechanism, thereafter allowing the vehicle to be wheeled easily along the ground either forwards or backwards. As wheeled vehicles improve, better-performing gearboxes are sought.

OBJECTS AND SUMMARY

It is an object of the invention to propose a transmission gearbox the design of which allows better performance without detriment to the compactness or simplicity of the box.

To this end, one subject of the invention is a transmission gearbox comprising, housed at least partially inside said box, a so-called output shaft made as a single piece or as at least two coaxial shaft sections, a rotary so-called drive member mounted free to rotate on said shaft, a drive system for rotationally driving said rotary drive member in a first, so-called forwards running, rotationally driven direction and in a second, so-called reverse-running, rotationally driven direction and, positioned between the shaft or each of the shaft sections and the rotary drive member, a clutch mechanism, the or each clutch mechanism housed inside the box having a disengaged state and an engaged state, the shaft or each shaft section being, when the corresponding clutch mechanism is in the disengaged state, free to rotate in either one of its directions of rotation, the or each so-called automatic clutch mechanism being configured so that, when the rotary drive member is rotationally driven in the first so-called forwards-running rotationally driven direction, said clutch passes from the disengaged state to the engaged state when the rotational speed of said rotary drive member is greater than that of the shaft or of said shaft section with which the clutch mechanism is intended to collaborate, and from the engaged state to the disengaged state by the rotational driving in forwards running of the shaft or of the shaft section with which the clutch mechanism collaborates, when the rotational speed of the shaft or of said shaft section is greater than the rotational speed of the rotary drive member, characterized in that the or each so-called automatic clutch mechanism is a clutch mechanism with two directions of operation and is also configured so that, when the rotary drive member is rotationally driven in the second so-called reverse-running rotationally driven direction, said clutch passes from the disengaged state to the engaged state when the rotational speed of said rotary drive member is greater than that of the shaft or of said shaft section with which the clutch mechanism is designed to collaborate, and from the engaged state to the disengaged state by the reverse-running rotational driving of the shaft or of the shaft section with which the clutch mechanism collaborates, when the rotational speed of the shaft or of said shaft section is greater than the rotational speed of the rotary drive member.

The creation of an automatic clutch mechanism with two directions of operation, namely forwards running and reverse running, means that the transmission gearbox can be equipped with a system for driving the rotation of the rotary drive member in forwards running and in reverse running without detriment to the simplicity of operation and of production of said transmission gearbox.

According to one embodiment of the invention, the or at least one of the clutch mechanisms comprises a moving part able to move on the shaft or the shaft section between a disengaged position and an engaged position, said part that can be rotationally driven by the rotary drive member being configured to pass from the engaged position corresponding to the engaged state of the clutch mechanism to the disengaged position corresponding to the disengaged state of the clutch mechanism through bearing contact with the rotary drive member. This design makes it possible to retain a particularly simple architecture and operation of the clutch mechanism without requiring the presence of a rapidly wearing component such as a spring, notably for return to the disengaged position. The moving part that can be rotationally driven by the rotary drive member is therefore configured to pass from the engaged position to the disengaged position by shifting axially along the shaft or the shaft section bearing said clutch mechanism. This axial movement can be brought about by simple bearing contact of the moving part against the rotary drive member.

According to one embodiment of the invention, the moving part of the clutch mechanism is configured to pass from the disengaged position to the engaged position through bearing contact with the rotary drive member. Once again, this design makes it possible to maintain a particularly simple architecture and operation of the clutch mechanism without the need for the presence of a rapidly wearing component such as a spring, notably for passing into the engaged position.

According to one embodiment of the invention, the moving part of the clutch mechanism is a part positioned between a part referred to as the fixed dog gear mounted to rotate as one with the shaft or the shaft section associated with the clutch mechanism, and a part of the rotary drive member, this moving part of the clutch mechanism being a moving part able to move axially on said shaft or said shaft section between a position close to said fixed dog gear, corresponding to the engaged state of the clutch mechanism, and a position separated from the fixed dog gear, corresponding to the disengaged state of the clutch mechanism.

According to one embodiment of the invention, the moving part of the clutch mechanism is a part that is permanently braked by a brake acting permanently on the angular speed of said moving part. As a preference, the brake is mounted without the ability to rotate inside the box.

According to one embodiment of the invention, the moving part of the clutch mechanism is a holed plate and the plate and the fixed dog gear are respectively equipped with teeth for rotationally coupling the plate and the fixed dog gear when the plate is in the state close to the fixed dog gear.

According to one embodiment of the invention, the moving part of the clutch mechanism is a plate equipped with ramps which are configured to collaborate through bearing contact with complementary ramps formed on the rotary drive member so as to move the plate axially in the direction closer to or away from the fixed dog gear that rotates as one with the shaft or the shaft section associated with the clutch mechanism.

According to one embodiment of the invention, the ramps of the plate and of the rotary drive member are each organized as a first and second series of ramps, with the ramps of one of the series active in forwards running and the ramps of the other series active in reverse running, these ramps of each series of ramps comprising a plurality of sets of ramps, each set of ramps or of a series of ramps of the rotary drive member comprising at least two ramps, these ramps of the rotary drive member collaborating, in the case of one of them, with one of the ramps of a set of ramps of a series of ramps of the plate to move the plate axially in the direction closer to the fixed dog gear corresponding to the engaged position, and in the case of the other with the other of the ramps of said set of ramps of a series of ramps of the plate to move the plate axially in the direction away from the fixed dog gear corresponding to the disengaged position.

According to one embodiment of the invention, the ramps of a set of ramps of the first series of ramps of the plate form, with the ramps of a set of ramps of the second series of ramps of the plate, a lozenge shape, these ramps preferably being helical ramps with the same helix pitch.

According to one embodiment of the invention, the moving part of the or of one of the clutch mechanisms and the rotary drive member are, for the purpose of rotationally driving the moving part by the rotary drive member, each equipped with teeth, each tooth of the moving part being mounted with clearance in the space between two teeth of the rotary drive member.

According to one embodiment of the invention, the or each clutch mechanism comprises two so-called moving dog gears, one of them for forwards running and the other for reverse running, these dog gears being borne by the rotary drive member, a so-called fixed dog clutch element fixed to rotate as one with the shaft or the shaft section bearing said clutch mechanism and a dog-clutch controller, said dog-clutch controller which is mounted, coaxially and with the freedom to rotate, on the shaft or the shaft section that bears it, being a part that is permanently braked by a brake acting permanently on the angular speed of said dog-clutch controller, this dog-clutch controller being equipped with a guideway for guiding the moving dog gears so as to allow each moving dog gear to pass selectively from a disengaged state to an engaged state in mesh with the so-called fixed dog clutch element, said guideway of the dog clutch controller being configured to allow the forwards-running mobile clutch dog to pass to the engaged state, in the state in which the rotary drive member is rotationally driven in the first, so-called forwards running, rotationally driven direction, when the rotational speed of said rotary drive member is greater than that of the shaft or of said shaft section with which the clutch mechanism is able to collaborate, and allow the reverse-running mobile clutch dog to pass into the engaged state, in the state in which the rotary drive member is rotationally driven in the second, so-called reverse-running, rotationally driven direction, when the rotational speed of said rotary drive member is greater than that of the shaft or of said shaft section with which the clutch mechanism is designed to collaborate, the fixed dog-clutch element forming a de-clutching cam for disengaging the forwards-running mobile clutch dog in the state in which the shaft or the shaft section with which the clutch mechanism collaborates is rotationally driven in forwards running when the rotational speed of the shaft or of said shaft section is greater than the rotational speed of the rotary drive member, and a declutching cam for disengaging the reverse-running mobile clutch dog in the state in which the shaft or the shaft section with which the clutch mechanism collaborates is rotationally driven in reverse running when the rotational speed of the shaft or of said shaft section is greater than the rotational speed of the rotary drive member. This design makes it possible to maintain a particularly simple architecture and operation of the clutch mechanism without needing the presence of a rapidly wearing component such as a spring, notably for return to the disengaged position.

According to one embodiment of the invention, each moving clutch dog adopts the form of a pivoting lever mounted with the ability to pivot about an axis parallel to the shaft or to the shaft sections in order for said moving clutch dog to pass from a disengaged state to an engaged state or vice versa.

According to one embodiment of the invention, said pivoting lever is provided with a stud positioned along or inside the guideway of the dog clutch controller, this stud being able to be positioned in bearing contact with the fixed dog clutch element.

According to one embodiment of the invention, the fixed dog clutch element adopts the form of a ring mounted to rotate as one with the shaft or the shaft section which bears it, said ring being equipped with at least two external radial projections, one or the other of said external radial projections forming an abutment against which one of the moving clutch dogs can bear when the clutch mechanism is in the engaged state, at least part of the external peripheral surface of the ring, which surface is created between said external radial projections, being configured to form the declutching-cam part of said fixed dog clutch element.

According to one embodiment of the invention, the dog clutch controller adopts the form of a rotary part of plate type through which the shaft or the shaft section that bears it passes, this rotary part being equipped with at least one through slot forming the guideway of said dog clutch controller.

Another subject of the invention is a self-propelled wheeled vehicle with a preferably walking operator, such as a lawnmower, comprising a primary drive shaft, wheels and a transmission gearbox that can be positioned between the primary drive shaft and the wheels of the vehicle, characterized in that the transmission gearbox is in accordance with that described hereinabove.

BRIEF DESCRIPTION OF THE DRAWINGS

The invention will be clearly understood from reading the following description of exemplary embodiments, with reference to the attached drawings in which.

DETAILED DESCRIPTION

As mentioned hereinabove, one subject of the invention is a transmission gearbox 1, more particularly intended to apply to a wheeled vehicle 20, notably one with a walking operator.

Figure 1:
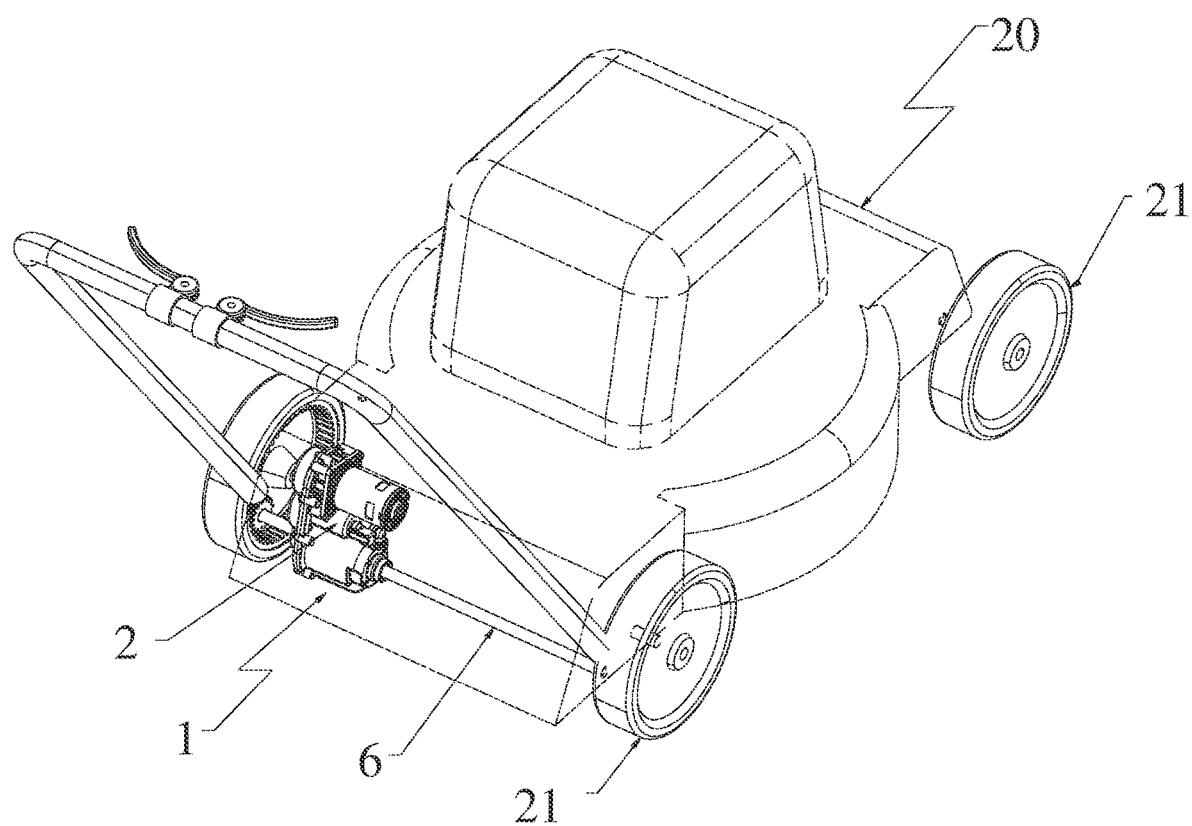
FIG. 1 depicts an overall view of a wheeled vehicle equipped with a transmission gearbox according to the invention.

FIG. 1 depicts the application of such a transmission gearbox 1 to a lawnmower. This lawnmower comprises a wheeled chassis, the rear wheels of the chassis being depicted as 21 in the figures.

The purpose of the transmission gearbox 1 here is to transmit a rotational movement to the rear wheels 21 of said vehicle. The transmission gearbox therefore comprises a shaft 6, known as the output shaft, produced as a single piece or as at least two coaxial shaft sections 6A, 6B, mounted with the freedom to rotate relative to one another. The shaft 6 or the shaft sections 6A, 6B here form the shaft that drives the wheels 21 of the one same pair of wheels of the vehicle either directly or via reduction gearing. This shaft 6 or the shaft sections 6A, 6B pass through the box 1 and project therefrom.

A rotary drive member 5 of the motor is mounted with the freedom to rotate on the shaft 6. This rotary member 5 is, in the examples depicted, a gearwheel through which the shaft 6 passes.

The transmission gearbox 1 further comprises a system 2 for driving the rotation of this rotary drive member 5. This rotational drive system 2 is configured to drive the rotary drive member 5 in rotation in a first so-called forwards running rotationally driven direction and in a second, opposite, so-called reverse running rotationally driven direction. This rotational drive system 2 may adopt a great many forms.

Figure 2:
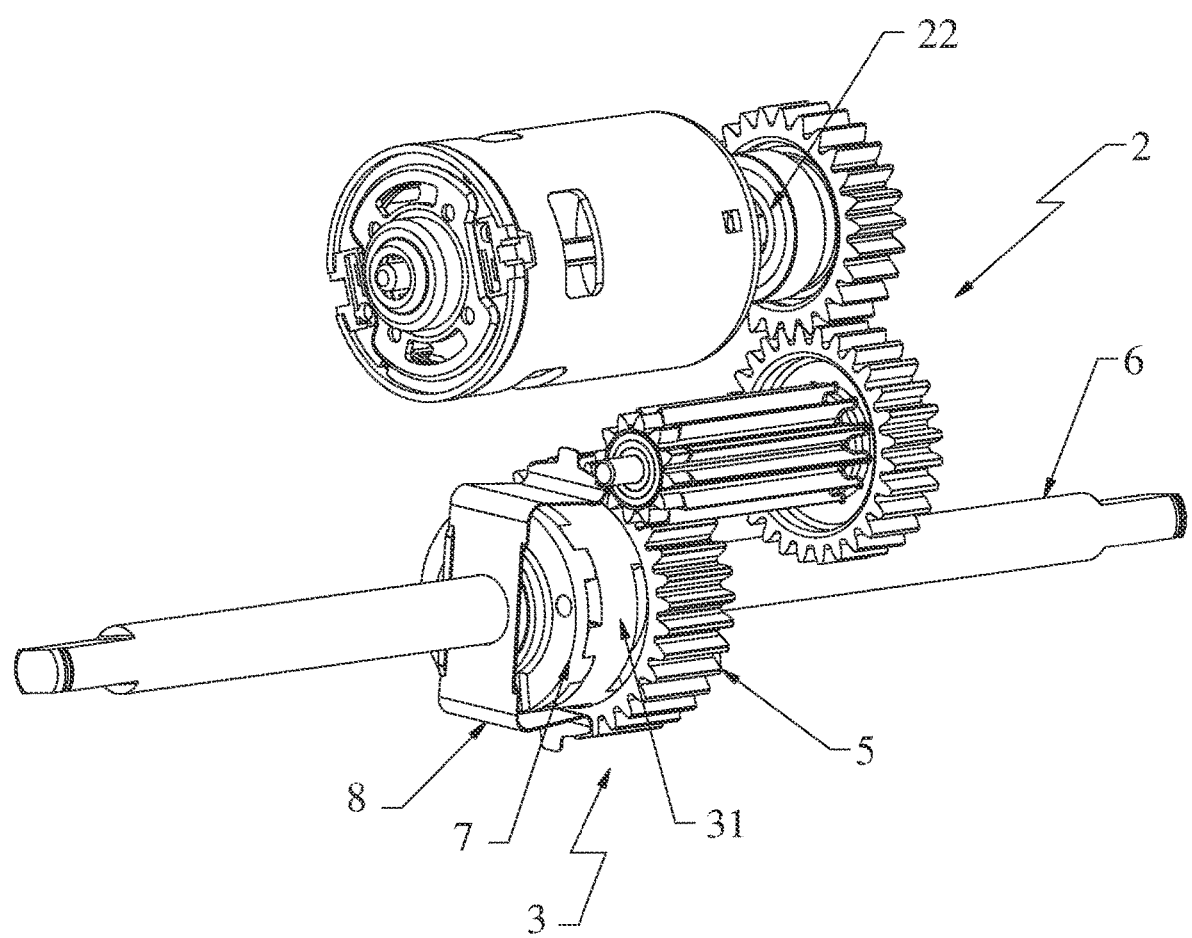
FIG. 2 depicts a perspective view of the elements housed at least partially inside a transmission gearbox according to the invention, with the box itself having been omitted.
Figure 8:
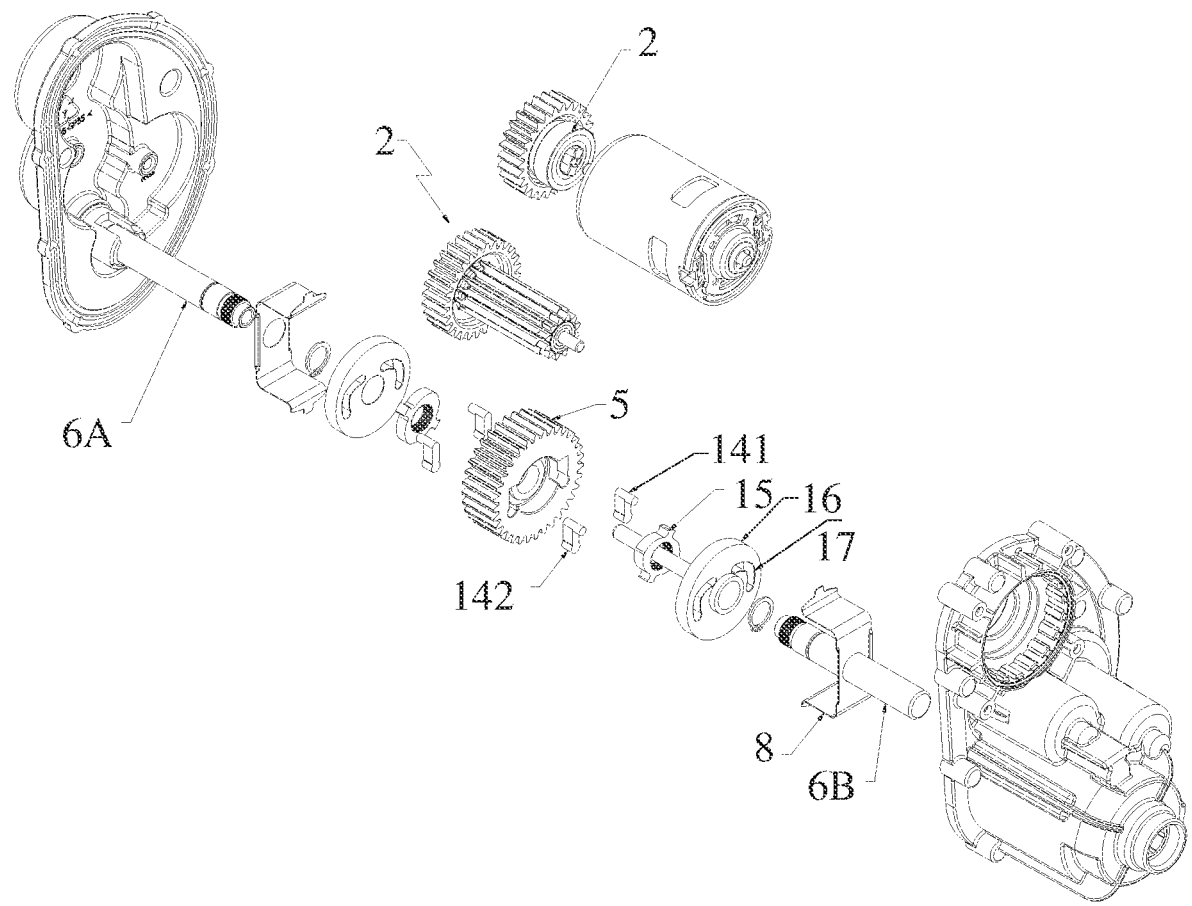
FIG. 8 depicts a perspective view of the elements of a box in the unassembled state, the box itself having been omitted.
Figure 9:
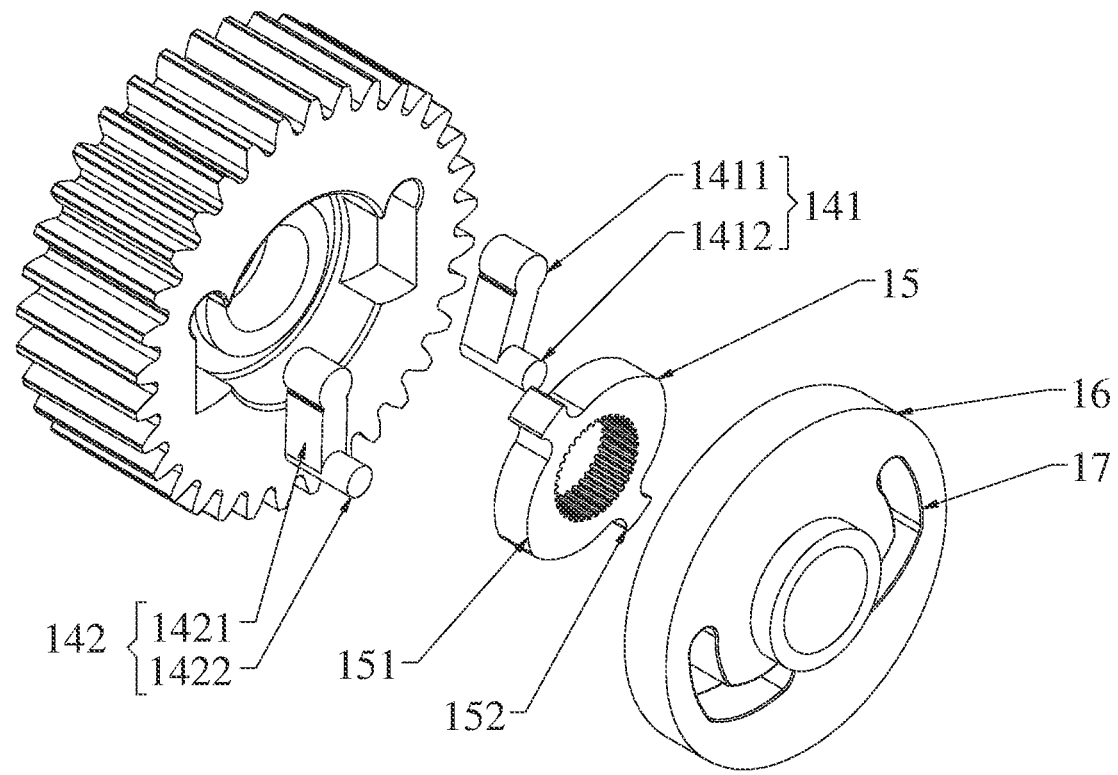
FIG. 9 depicts a partial perspective exploded view of the elements of a clutch mechanism and of the rotary drive member.
Figure 10:
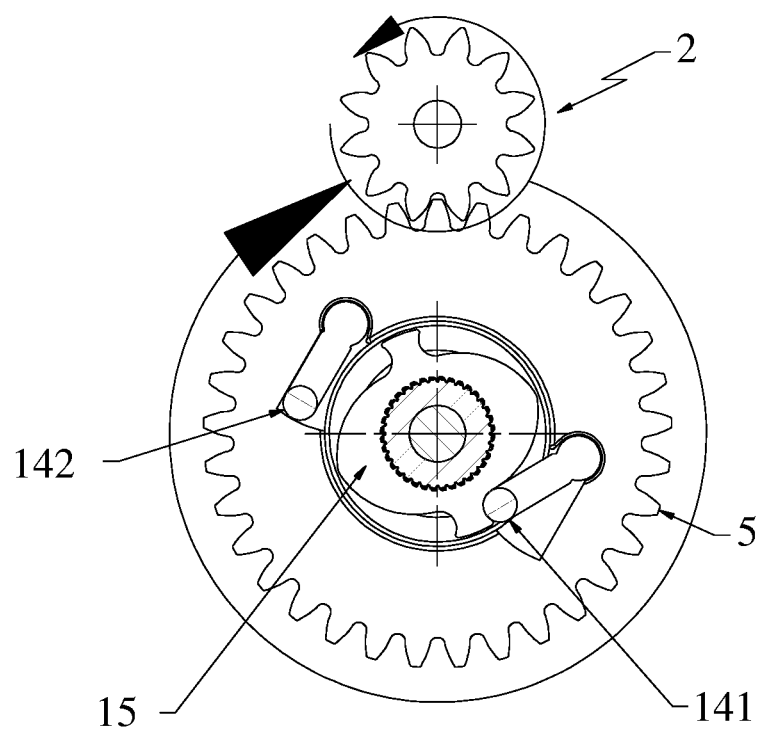
FIG. 10 depicts a partial face-on view of a clutch mechanism associated with the rotary drive member and with the device for driving rotation of said rotary drive member, in the state in which said rotary drive member is driven in forwards running.
Figure 11:
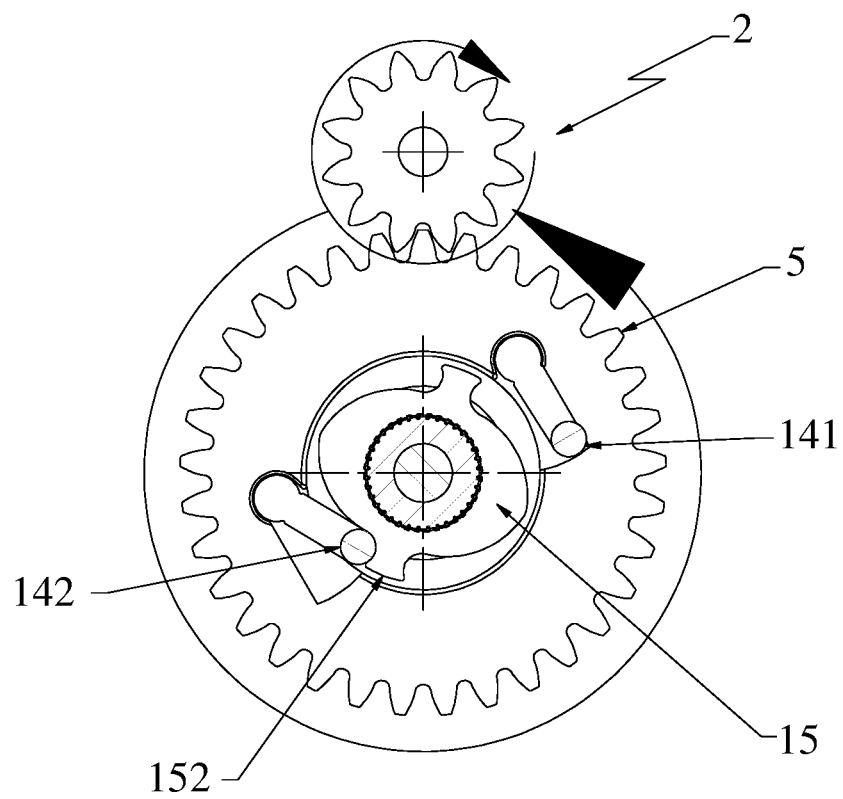
FIG. 11 depicts a partial face-on view of a clutch mechanism associated with the rotary drive member and with the device for driving rotation of said rotary drive member, in the state in which said rotary drive member is driven in reverse running.
Figure 12:
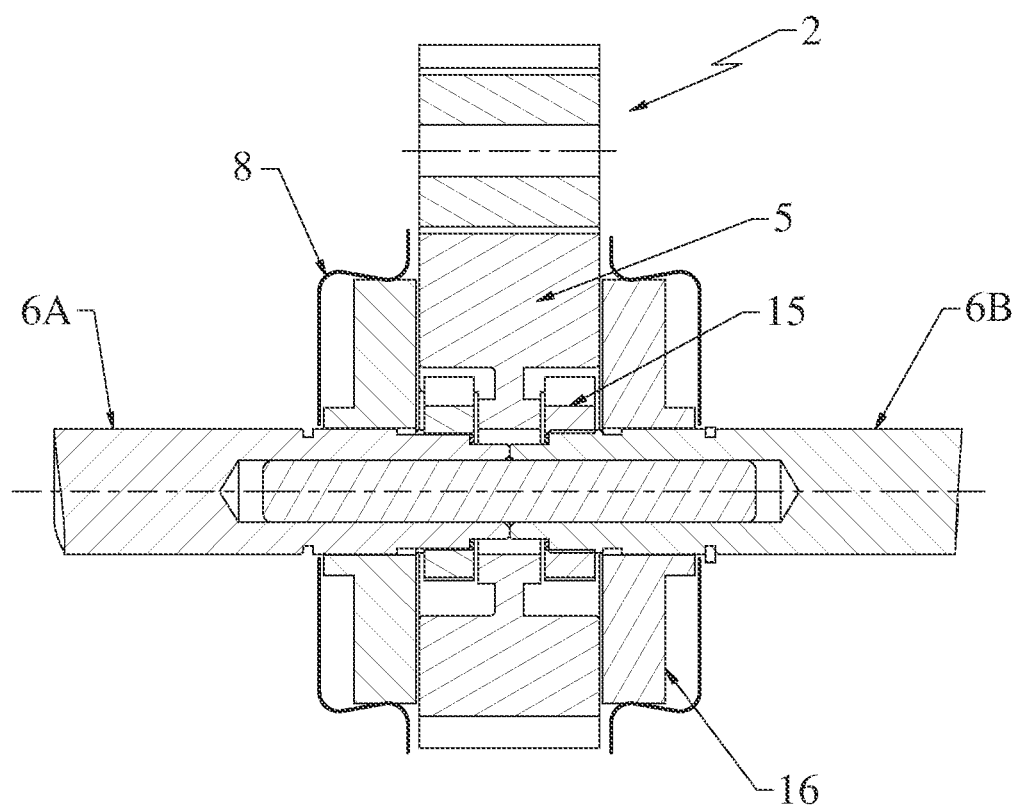
FIG. 12 depicts a view in partial section of the elements housed at least partially inside a transmission gearbox according to the invention, the box having been omitted.
Figure 14:
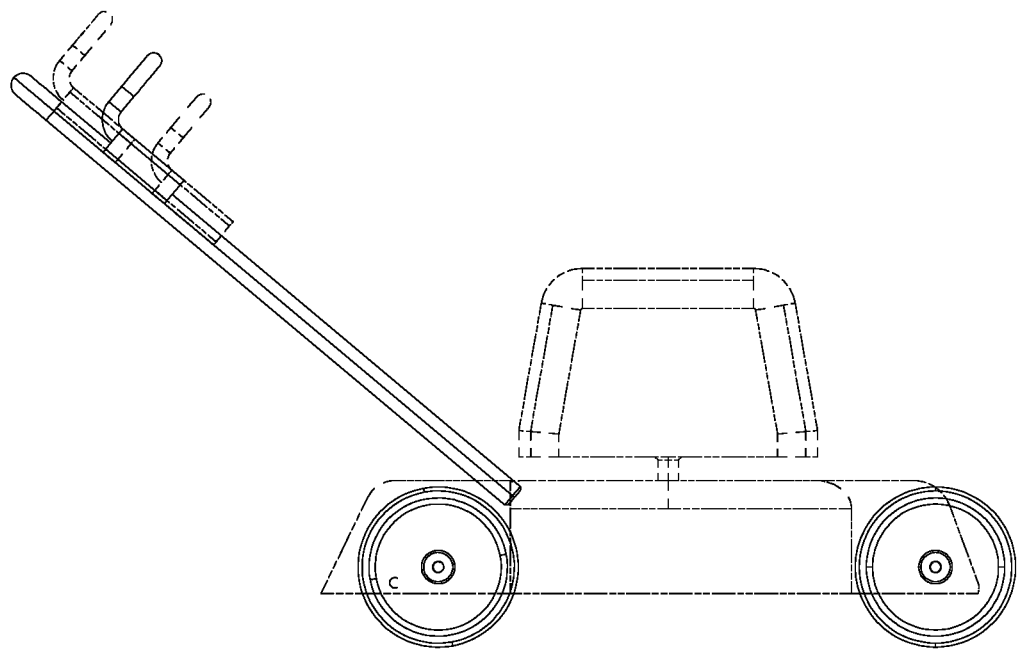
FIG. 14 depicts another perspective view of a wheeled vehicle according to the invention.
Figure 14:
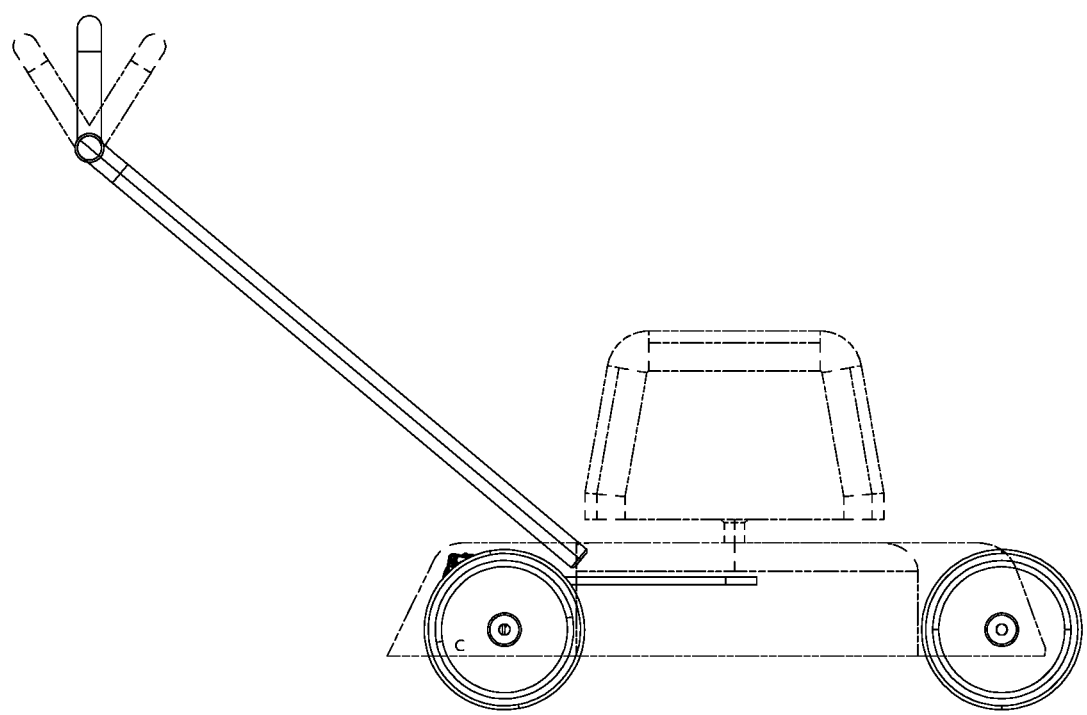

In the examples depicted in FIGS. 2 and 8, this rotational drive system 2 comprises an electric motor with two directions of rotation, and pinions transmitting the rotational movement of the drive shaft 22 to the rotary drive member 5. This electric motor can be made to rotate using a single pivoting lever placed on the handlebar of the vehicle or using a sliding sleeve, as illustrated in FIG. 14, or using two lever handles, as illustrated in FIG. 1.

A clutch mechanism 3 or 4 is placed inside the transmission gearbox 1 between the shaft 6 or each of the shaft sections 6A, 6B and the drive wheel 5 that forms the rotary drive member 5.

Figure 3:
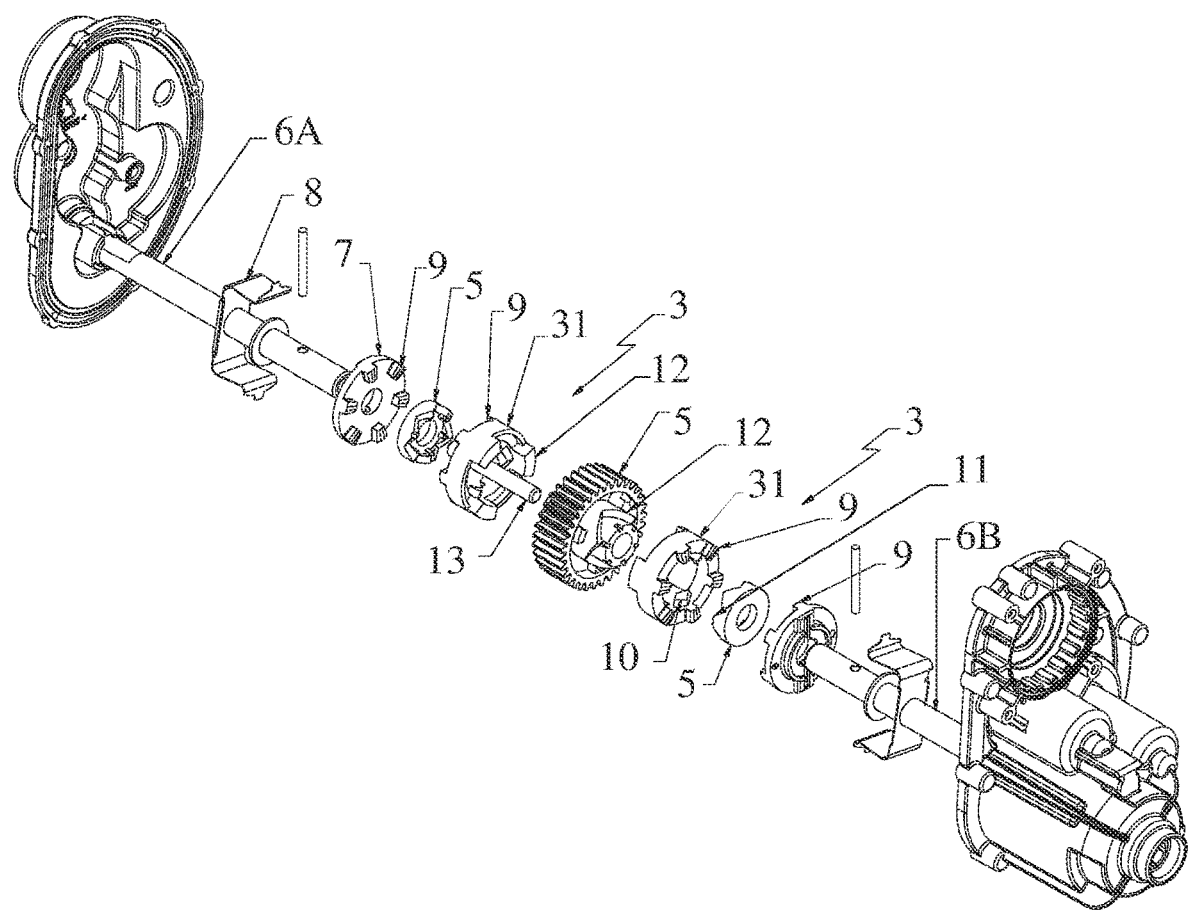
FIG. 3 depicts an exploded view of the elements borne by the wheel-driving output shaft of a transmission gearbox according to the invention.
Figure 4:
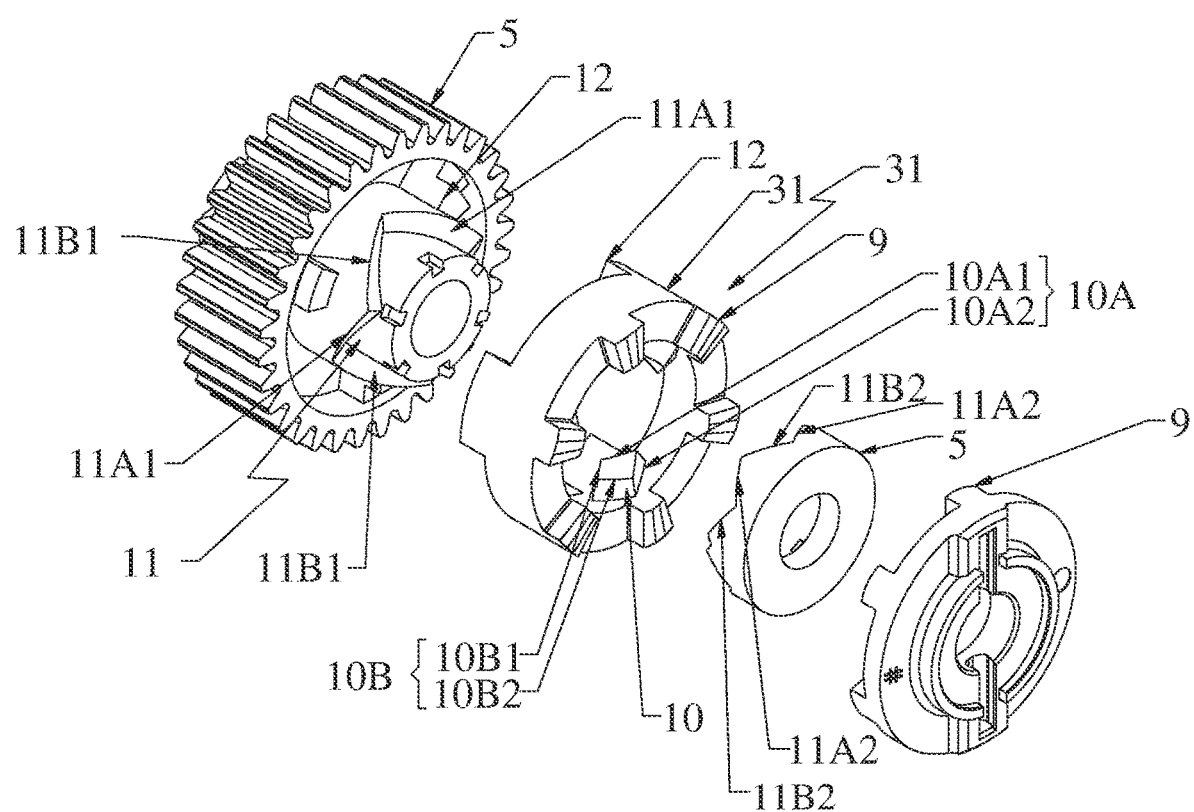
FIG. 4 depicts a partial exploded view of elements designed to be borne by the output shaft that drives the wheels of the vehicle of a transmission gearbox according to the invention.
Figure 5:
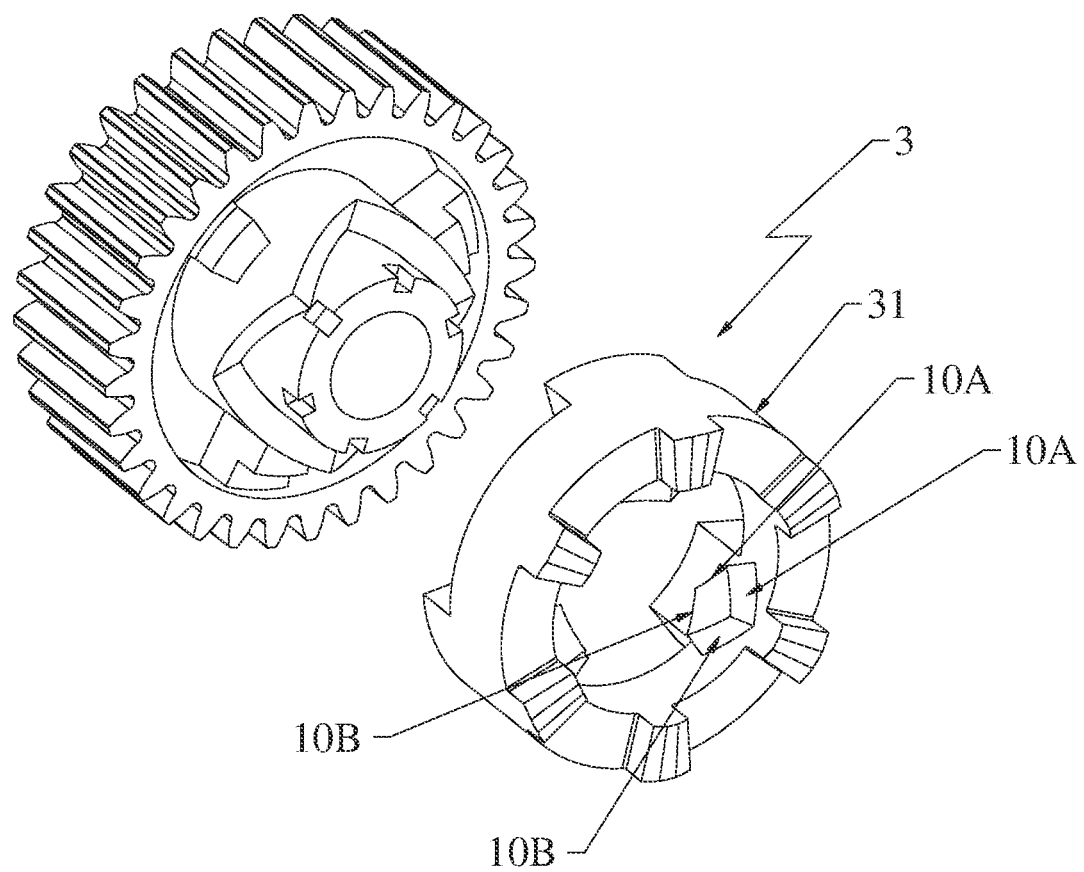
FIG. 5 depicts a partial perspective view of the rotary drive member and of the moving part of a clutch mechanism according to the invention.
Figure 6A:
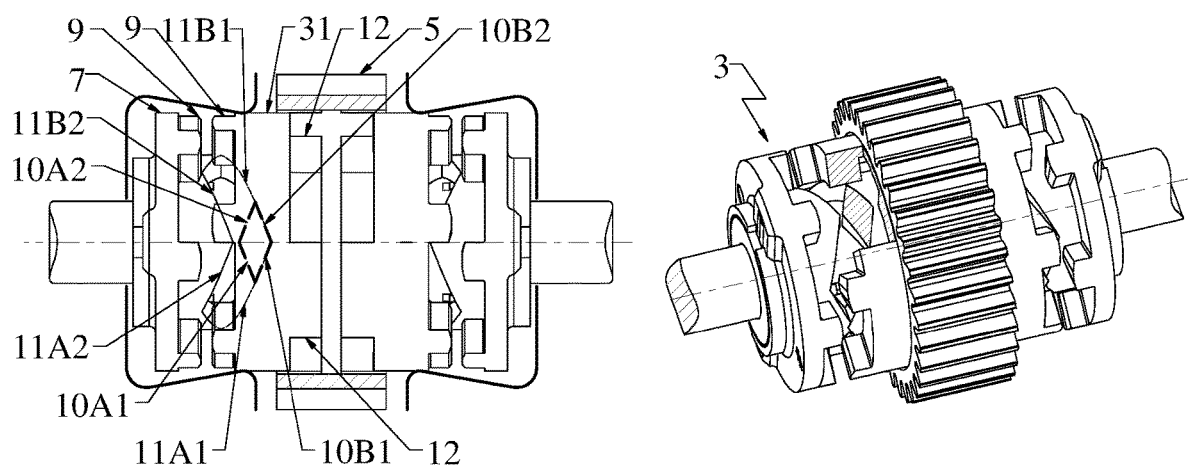
FIG. 6A illustrates, in the form of views in section and partially in perspective, a clutch mechanism in the disengaged state.
Figure 6B:
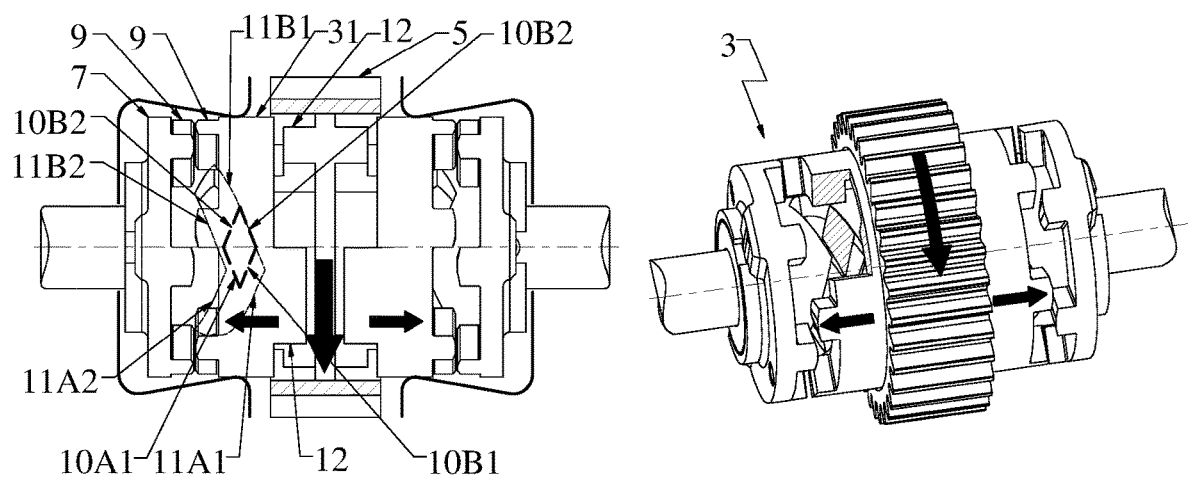
FIG. 6B illustrates, in the form of views in section and partially in perspective, a clutch mechanism as it passes from the disengaged state to the engaged state.
Figure 6C:
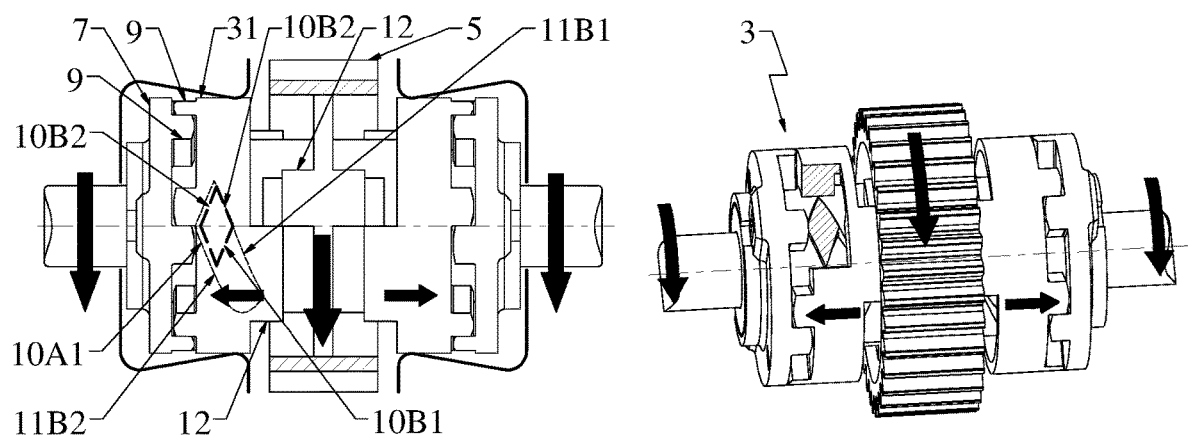
FIG. 6C illustrates, in the form of views in section and partially in perspective, a clutch mechanism in the engaged state.
Figure 7A:
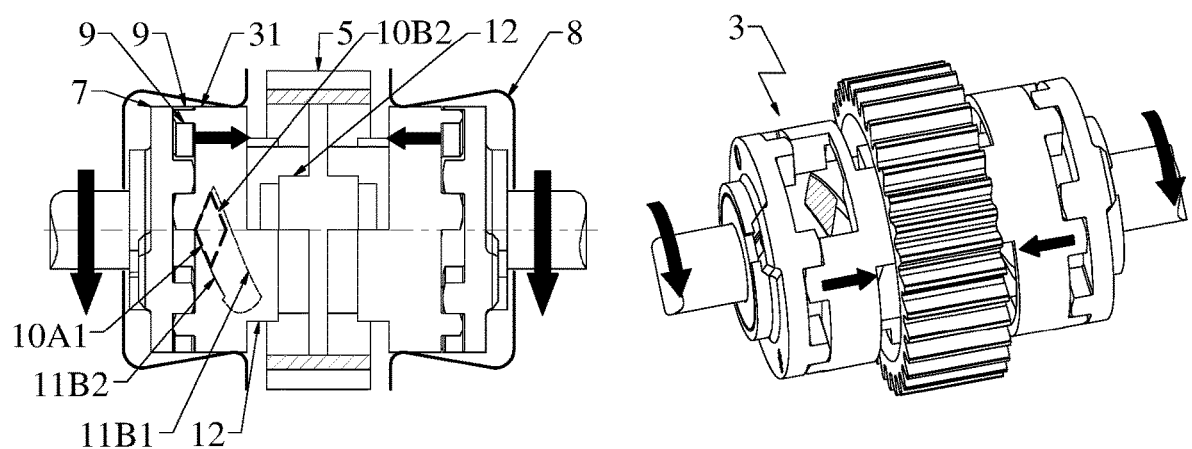
FIG. 7A illustrates, in the form of views in section and partially in perspective, the passage of a clutch mechanism from the engaged state to the disengaged state.
Figure 7B:
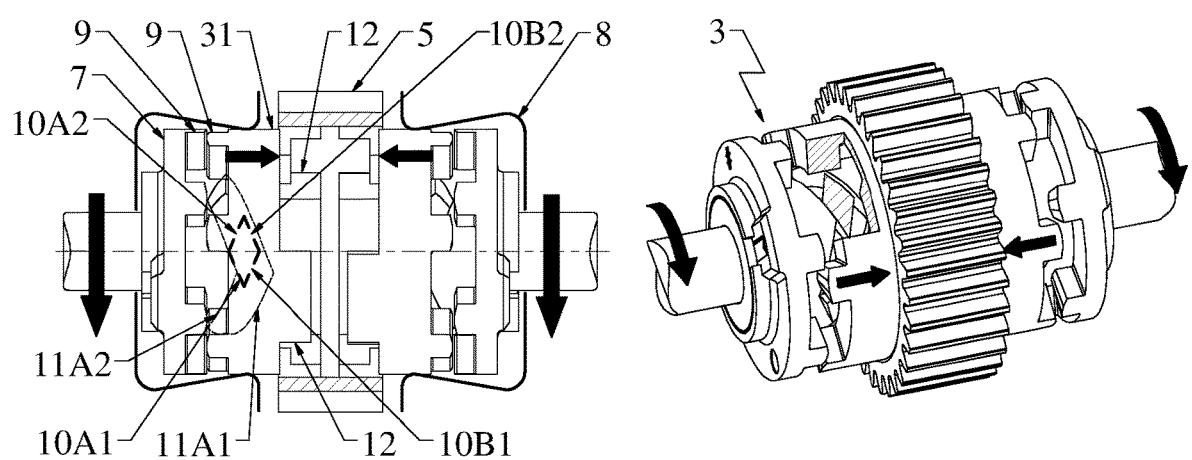
FIG. 7B illustrates, in the form of views in section and partially in perspective, the passage of a clutch mechanism during disengagement.
Figure 7C:
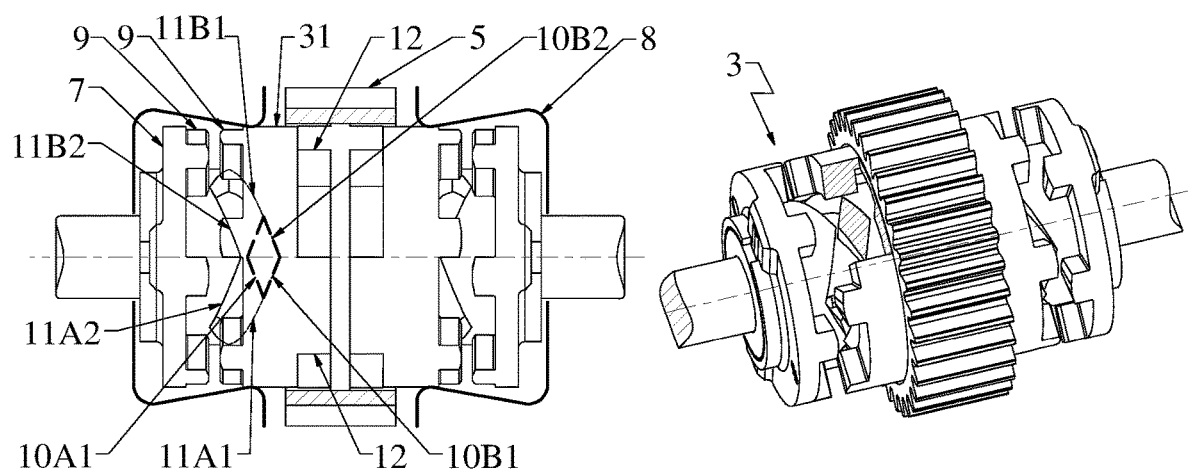
FIG. 7C illustrates, in the form of views in section and partially in perspective, the clutch mechanism in the disengaged state.

In the example of FIG. 3, the shaft 6 is produced in two coaxial shaft sections 6A, 6B connected by a connecting element 13 on which said shaft sections are mounted with the freedom to rotate so that when aligned they can be given a relative rotational movement. In that case, the transmission comprises two clutch mechanisms 3 or 4, each one positioned between the rotary drive member 5 and one of the sections 6A, 6B of wheel-driving shaft. These clutch mechanisms 3 or 4 are able to transmit, in the case of one of them, the movement of the rotary drive member 5 to the section 6A of wheel-driving shaft and, in the case of the other, the movement of the rotary drive member 5 to the section 6B of wheel-driving shaft. In this way, the rotary drive member 5, positioned coaxial with the sections of wheel-driving shaft, is positioned between two clutch mechanisms, each clutch mechanisms 3 or 4 being borne at least partially by a wheel shaft section belonging to the one same pair of wheels of the vehicle.

In the example depicted in FIG. 2, the shaft 6 is produced as a single piece and bears just one single clutch mechanism. The design and operation of the clutch mechanisms of FIGS. 2 and 3 are the same.

The presence of two sections of shaft means that a differential function can be incorporated into the transmission gearbox, without detriment to the operation of the whole.

Each clutch mechanism comprises, irrespective of its design, an engaged state and a disengaged state. The shaft 6 or each shaft section 6A, 6B, when the associated clutch mechanism is in the disengaged state, is free to turn in either one of its directions of rotation. Each clutch mechanism is a clutch mechanism with two directions of operation, namely is configured to pass from the disengaged state to the engaged state through the driving of the rotary drive member 5 in a first so-called forwards running rotationally driven direction and through the driving of the rotary drive member 5 in a second so-called reverse running rotationally driven direction that is the opposite to the first rotationally driven direction. This clutch is capable of operating when the rotational speed of the rotary drive member 5 is greater than that of the shaft or shaft section bearing said mechanism.

In the same way, each clutch mechanism is able to pass automatically from the engaged state to the disengaged state, both during forwards running and during reverse running, that is to say in the state in which the rotary drive member 5 is being driven in rotation in forwards running, when the rotational speed of the shaft 6 or of the shaft section bearing the clutch mechanism, and rotationally driven in forwards running, is greater than the rotational speed of the rotary drive member 5, and in the state in which the rotary drive member 5 is driven in rotation in reverse running when, once again, the rotational speed of the shaft 6 or of the shaft section bearing the clutch mechanism, and rotationally driven in reverse running, is greater than the rotational speed of the rotary drive member 5.

Exemplary embodiments of such a clutch mechanism are described hereinbelow.

Such a clutch mechanism is notably characterized, despite its numerous functionalities, by the absence of a spring by way of a means of return to the disengaged state. The passage from the engaged state to the disengaged state is therefore achieved in the absence of an elastic return means and simply by bearing contact of the parts with one another.

In the example depicted in FIGS. 2 to 7C, each clutch mechanism depicted and denoted by the general reference 3 comprises a moving part 31 that can be moved axially along the shaft or shaft section that bears it, between a position corresponding to the disengaged state of the clutch mechanism and an engaged position corresponding to the engaged state of the clutch mechanism, through bearing contact with the rotary drive member 5.

Thus, this moving part 31 can be moved axially along the shaft or the shaft section that bears it, by bearing contact with the rotary drive member 5 to pass from an engaged position to a disengaged position and to pass from a disengaged position to an engaged position.

In the examples depicted in FIGS. 2 to 7C, the moving part 31 of the clutch mechanism 3 is a part that is permanently braked by a brake 8 having a permanent action on the angular speed of said moving part 31. This brake 8 in this instance takes the form of a U-shaped leaf spring. The web of the U is equipped with a through-hole so that the brake can be slipped onto the shaft. The branches of the U each bear against the peripheral surface of the moving part 31, which takes the form of a circular plate holed at the center so that it can be slipped over the shaft 6 or the shaft section that bears it. This brake 8 is mounted fixed and unable to rotate inside the box. To this end, the brake 8 is, for example, fitted with two lugs positioned at the branches of the U. These lugs fit into grooves made in the box. This lug/groove collaboration immobilizes the brake 8 in terms of rotation inside the box.

This moving part 31 is positioned between a part 7 referred to as the fixed dog gear, mounted to rotate as one with the shaft 6 or shaft section that bears it, and a part of the rotary drive member 5.

This fixed dog gear 7 so-called because it is fixed with respect to the shaft 6 or the shaft section that bears it, also takes the form of a circular plate holed at the center. The moving part 31 and the fixed dog gear 7 are equipped with axial teeth 9, namely with teeth which in each instance project from a face of the plate that forms the moving part 31 or from the fixed dog gear 7. Thus, in the position in which the moving part 31 and the corresponding fixed dog gear 7 are close together, with the clutch mechanism 3 in the engaged state, the teeth 9 of the moving part 31 and the teeth 9 of the fixed dog gear 7 each form crenelations that nest together to couple the moving part 31 and the fixed dog gear 7 in terms of rotation.

In order to allow such axial movement of the moving part 31 between a position close to the corresponding fixed dog gear 7 when the clutch mechanism 3 is in the engaged state, and a position separated from the corresponding fixed dog gear 7 when the clutch mechanism 3 is in the disengaged state, the moving part 31 is equipped with ramps 10 configured to collaborate through bearing contact with complementary ramps 11 formed on the rotary drive member 5.

In the examples depicted, the rotary drive member 5 which externally adopts the form of a gearwheel is, in this instance, for the purposes of ease of manufacture, produced as two parts incapable of rotating independently of one another, with each part bearing ramps 11. This rotary drive member 5 could, as an equivalent solution, have been produced as a single piece. This rotary drive member 5, which adopts the form of a toothed wheel with a wheel hub and an external peripheral toothset, leaves an annular space between the hub of the wheel and the external peripheral toothset of the wheel. The hub forms a sleeve onto which the moving part 31 may be slipped.

When the moving part 31 is in place slipped onto the hub of the wheel of the rotary member 5, part of the ramps 10 of the moving part 31 are able to come into bearing contact with part of the ramps 11 of the rotary drive member 5. In practice, the ramps 10 of the moving part 31 are positioned inside the hole in the centrally holed plate that forms said moving part 31. These ramps 10 of the moving part 31 are organized as two series of ramps with the ramps 10A active in forwards running and the ramps 10B active in reverse running. These ramps of each series 10A or 10B of ramps comprise a plurality of sets of ramps depicted as 10A1 and 10A2 in the case of the series of ramps 10A and as 10B1 and 10B2 in the case of the series of ramps 10B. These steps of ramps are distributed circumferentially on the moving part 31. Each set of ramps 10A1, 10A2 or 10B1, 10B2 comprises two ramps.

In the examples depicted, the ramps 10A1, 10A2 of a set of ramps of the first series of ramps of the plate 31 form, with the ramps 10B1, 10B2 of a set of ramps of the second set of ramps of the plate 31, a lozenge shape. These ramps 10A1, 10A2, 10B1, 10B2 are preferably helical ramps with the same helix pitch. The ramps 10A1, 10A2 of a set of ramps of the series of ramps 10A of the moving part 31 are positioned on each side of a plane perpendicular to the shaft 6 or to the shaft section 6A or 6B that bears the moving part 31. The ramps 10A1 positioned on the one same side of the plane are positioned on the one same circle the center of which passes through the shaft 6 or the shaft section 6A or 6B that bears the moving part 31. The same is true of the ramps 10A2 positioned on the other side of the plane. The ramps 10A1, 10A2 of one set of ramps of the series of ramps 10A thus form two adjacent sides of the lozenge.

In the same way, the ramps 10B1, 10B2 of each set of ramps of the series of ramps 10B of the moving part 31 are positioned on each side of a plane perpendicular to the shaft 6 or shaft section 6A or 6B that bears the moving part 31. The ramps 10B1 positioned on the one same side of the plane are positioned on the one same circle the center of which passes through the shaft 6 or the shaft section 6A or 6B that bears the moving part 31. The same is true of the ramps 10B2 positioned on the other side of the plane. The ramps 10B1, 10B2 of a set of ramps of the series of ramps 10B therefore form the other two adjacent sides of the lozenge.

The ramps 11 of the rotary drive member 5 are likewise organized as two series of ramps depicted as 11A and 11B in the figures, with the ramps 11A1, 11A2 of the series of ramps 11A active in forwards running, namely in the state in which the rotary drive member 5 is driven in rotation in the first so-called forwards running rotationally driven direction, and the ramps 11B1, 11B2 of the series of ramps 11B active in reverse running, namely in the state in which the rotary drive member 5 is rotationally driven in the second so-called reverse running rotationally driven direction.

These ramps 11A and 11B form two circular sawtooth sets of crenelations coaxial with the shaft 6 or with the shaft section that bears the rotary drive member 5 and offset axially along said shaft.

These circular crenelations are positioned facing one another, on either side of the ramps 10A1, 10A2, 10B1, 10B2 borne by the moving part 31. Thus, the ramps 10 of the plate that forms the moving part 31 extend between the complementary ramps 11 of the rotary drive member 5. The complementary ramps 11 of the rotary drive member 5 therefore extend on each side of the ramps 10 of the plate 31 that forms the moving part 31. These ramps 11 of the rotary drive member 5 can therefore act, turn by turn, on the ramps 10 of the moving part 31.

Each crenelation of sawtooth ramps which is formed by ramps of the rotary drive member 5 is formed of an alternation of one ramp of the rotary drive member 5 that is active in forwards running and one ramp of the rotary drive member 5 that is active in reverse running. In this way, one of the flanks of a sawtooth of the crenelation is formed by a ramp 11A of the rotary drive member 5 that is active in forwards running, whereas the other flank of the sawtooth of the crenelation is formed by a ramp 11B of the rotary drive member 5 that is active in reverse running.

The ramps 11A of the series of ramps that are active in forwards running of the rotary drive member 5 comprise a plurality of sets of ramps with each set of ramps comprising two ramps depicted as 11A1 and 11A2 in the figures, with one of the ramps, for example the ramp 11A1 of said set belonging to one of the crenelations of ramps and the other ramp, such as the ramp 11A2, belonging to the other crenelation.

In the same way, the ramps 11B of the series of ramps that are active in reverse running of the rotary drive member 5 comprise a plurality of sets of ramps depicted as 11B1 and 11B2 in the figures, with one of the ramps, for example the ramp 11B1 of said set belonging to one of the crenelations of ramps and the other ramp, such as the ramp 11B2, belonging to the other crenelation.

The ramps 11A1, 11A2 of one set of ramps of the series of ramps 11A that are active in forwards running of the rotary drive member 5 collaborate by bearing contact with the ramps 10A1, 10A2 of a set of ramps of the series of ramps 10A that are active in forwards running of the moving part 31 to move the moving part 31 axially along the shaft 6 or the shaft section that bears it, in the direction closer to or away from the fixed dog gear 7.

Thus, in the state in which the rotary drive member 5 is rotationally driven in the first so-called forwards running rotationally driven direction, and when the rotational speed of the rotary drive member 5 is greater than that of the shaft or shaft section bearing the clutch mechanism, the ramps 11A1 of the rotary drive member 5 that are borne by the sawtooth crenelation furthest from the fixed dog gear 7 collaborate through bearing contact with the ramps 10A1 that are active in forwards running and that form one side of the lozenge of the moving part 31 to move the moving part 31 axially in the direction closer to the fixed dog gear 7 corresponding to the passage of the clutch mechanism from the disengaged state to the engaged state.

In the same way, in the state in which the clutch mechanism is engaged and the rotary drive member 5 is being rotationally driven in the first so-called forwards running rotationally driven direction, when the rotational speed of the rotary drive member 5 drops below the rotational speed of the shaft 6 or of the shaft section that bears the clutch mechanism, the ramps 11A2 of the rotary member 5 that are borne by the sawtooth crenelation closest to the fixed dog gear 7 collaborate through bearing contact with the ramps 10A2 that are active in forwards running and that form another side of the lozenge of the moving part 31 to move the moving part 31 axially in the direction away from the fixed dog gear 7 so that the clutch mechanism passes from the engaged state to the disengaged state.

Operation in reverse running is similar, the ramps 11B1 and 10B1 collaborating with one another for the passage from the disengaged state to the engaged state and the ramps 11B1 and 10B2 collaborating with one another for the passage from the engaged state to the disengaged state.

Thus, the rotary drive member 5 bears all of the ramps needed for moving the moving part 31 axially in the direction of clutch engagement or disengagement. This results in mechanical simplicity and reliability of the assembly.

To perfect the assembly, the moving part 31 of the clutch mechanism 3 and the rotary drive member 5 are, for the rotational driving of the moving part 31 by the rotary drive member 5, each equipped with teeth 12. Each tooth 12 of the moving part 31 is mounted with clearance in the space between two teeth 12 of the rotary drive member 5. These teeth 12 are axial teeth formed on one of the faces of the plate that forms the moving part 31 and in the annular space facing the rotary drive member 5.

As an alternative, the clutch mechanism 4 may be in accordance with that depicted in FIGS. 8 to 13C. In that embodiment, each clutch mechanism 4 comprises two moving dog gears depicted as 141 and 142 in the figures and referred to, in the case of one of them, as the forwards-running mobile dog gear 141 and, in the case of the other, as the reverse-running mobile dog gear 142. Each of these moving dog gears is borne by the rotary drive member 5.

Said clutch mechanism 4 further comprises a so-called fixed dog clutch element 15, mounted axially fixed and rotationally integral with the shaft 6 or the shaft section bearing said clutch mechanism 4, and a dog clutch controller 16.

In this first embodiment, it is the dog clutch controller 16 which is a part that is permanently braked by a brake 8 acting permanently on the angular speed of the dog clutch controller 16. This brake 8 is once again a U shaped leaf spring. When the shaft is formed of two shaft sections each bearing a clutch mechanism as in the example depicted in FIG. 8, each leaf spring is slipped over the output shaft and the branches of the U of each leaf spring come into bearing contact with a dog clutch controller 16.

In the examples depicted, this dog clutch controller 16 takes the form of a rotary part mounted coaxially and with freedom to rotate on the shaft or the shaft section that bears it.

This dog clutch controller 16 is a rotary part of the plate type through which the shaft 6 or the shaft section that bears it passes. This rotary part is equipped with at least one through-slot forming the guideway 17 of the dog clutch controller 16.

In the examples depicted, this guideway 17 is formed by means of two through-slots formed in the dog clutch controller 16. Specifically, this dog clutch controller 16 is equipped with a guideway 17 for each moving clutch dog 141, 142, so as to allow each moving clutch dog 141, 142 to pass selectively from a disengaged state to an engaged state in mesh with the fixed dog clutch element 15.

The guideway 17 of the dog clutch controller 16 is configured to allow the forwards-running mobile dog gear 141 to pass into the engaged state, in the state in which the rotary drive member 5 is driven in rotation in the first so-called forwards running rotationally driven direction when the speed of said rotary drive member 5 is greater than that of the shaft or of said shaft section with which the clutch mechanism is intended to collaborate, and the reverse-running mobile clutch dog 142 to pass into the engaged state, in the state in which the rotary drive member 5 is rotationally driven in the second so-called reverse running rotationally driven direction when the rotational speed of the rotary drive member 5 is greater than that of the shaft 6 or of the shaft section 6A, 6B with which the clutch mechanism 4 is intended to collaborate.

In the examples depicted, each moving clutch dog 141, 142 borne by the rotary drive member 5 adopts the form of a pivoting lever mounted with the ability to pivot about an axis parallel to the shaft 6 or to the shaft sections bearing said moving clutch dog so that said moving clutch dog 141, 142 can pass from a disengaged state to an engaged state or vice versa.

For this purpose, each pivoting lever 1411 or 1421 has a rounded end in the form of a portion of a cylinder, this rounded end becoming inserted in a longitudinally split cylindrical housing of the rotary drive member 5. This cylindrical housing opens onto one of the faces of the toothed wheel formed by the rotary drive member 5. The shape of said housing allows the lever a pivoting movement inside the housing.

This pivoting lever 1411 or 1421 is equipped at its opposite end to the one that forms a pivot with a stud that fits into the guideway 17, namely the slot in the dog clutch controller. This stud is depicted as 1412 in the case of the forwards running mobile dog gear 141 and as 1422 in the case of the reverse running mobile dog gear 142. This stud can be positioned in bearing contact with the fixed dog clutch element 15 when the moving clutch dog is in the engaged state.

In the examples depicted, the fixed dog clutch element 15 adopts the form of a ring 151 mounted with inability to rotate independently of the shaft 6 or of the shaft section that bears it. This ring 151 is equipped with at least two external radial projections 152. The ring is mounted for rotation with the shaft that bears it by means of axial splines formed on the inside of the ring, these splines collaborating with male splines on the shaft or the shaft section bearing the fixed dog clutch element 15.

This ring is also equipped with two external radial projections 152 forming an abutment against which one or other of the mobile dog gears 141 or 142 can bear when the clutch mechanism 4 is engaged, depending on the direction of operation, namely according to the direction of rotational drive selected by the rotary drive member 5.

The guideway 17 of the dog clutch controller 16 therefore comprises, at each slot and, therefore, for each mobile dog gear, a first part positioned on a circle the center of which coincides with the axis of rotation of the shaft 6, and a second part positioned in the continuation of the first part and configured to develop with a tendency toward the axis of rotation of the dog clutch controller 16. These first and second parts of a slot of the guideway thus allow a stud belonging to a mobile dog gear, as it moves along inside said first and second parts, to pass, through the pivoting of the lever that bears it, from a position separated from the element 15 of the fixed dog gear when it is running along the first part of the guideway, to a position close to the element 15 of the fixed clutch dog when it is running along the second part of the guideway, this stud being, in the second part of the guideway, able to be positioned in bearing contact with a radial projection 152 of the fixed dog clutch element 15 so as to transmit the rotational movement of the rotary drive member 5 to the fixed dog clutch element 15.

The first and second parts of the guideway of the forwards running mobile dog gear are produced with the first and second parts of the guideway of the reverse running mobile dog gear in correspondence to make it possible, when the stud of the forwards running mobile dog gear is positioned in the first part of the guideway, for the stud of the reverse running mobile dog gear to be positioned in the second part of the guideway, and vice versa, the transition between the first and second parts of the guideway in each slot of the guideway corresponding to the position adopted by each of the studs in the position in which the two studs of the fixed dog clutch element 15 are spaced apart.

Figure 13A:
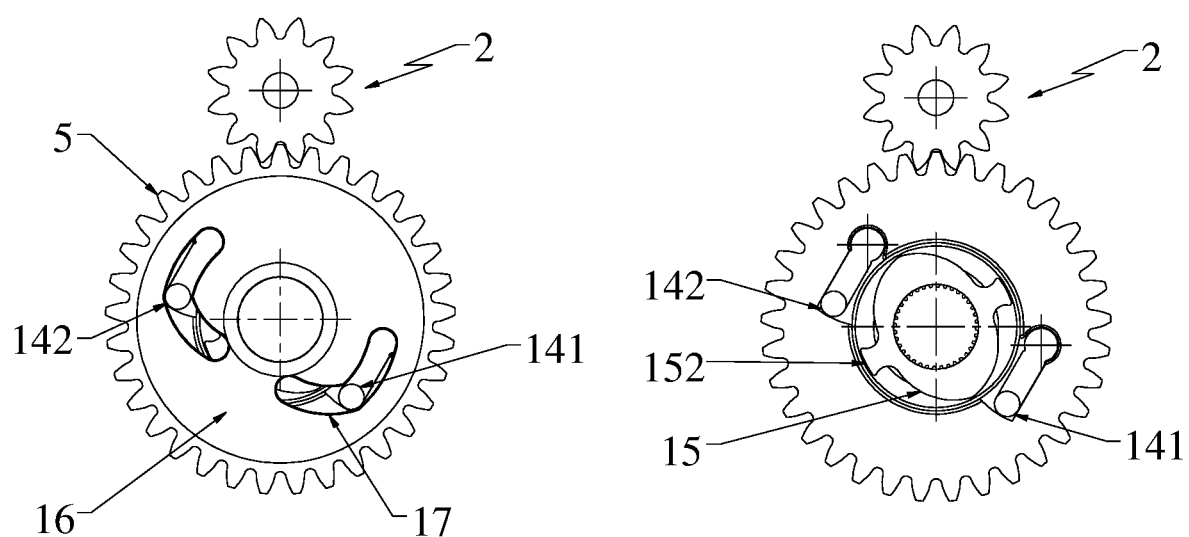
FIG. 13A illustrates, in the form of face-on views with the dog clutch controller (left-hand view) and without the dog-clutch controller (right-hand view), a clutch mechanism in the state in which the rotary drive member is driven in forwards running and in the state in which said clutch mechanism is disengaged.
Figure 13B:
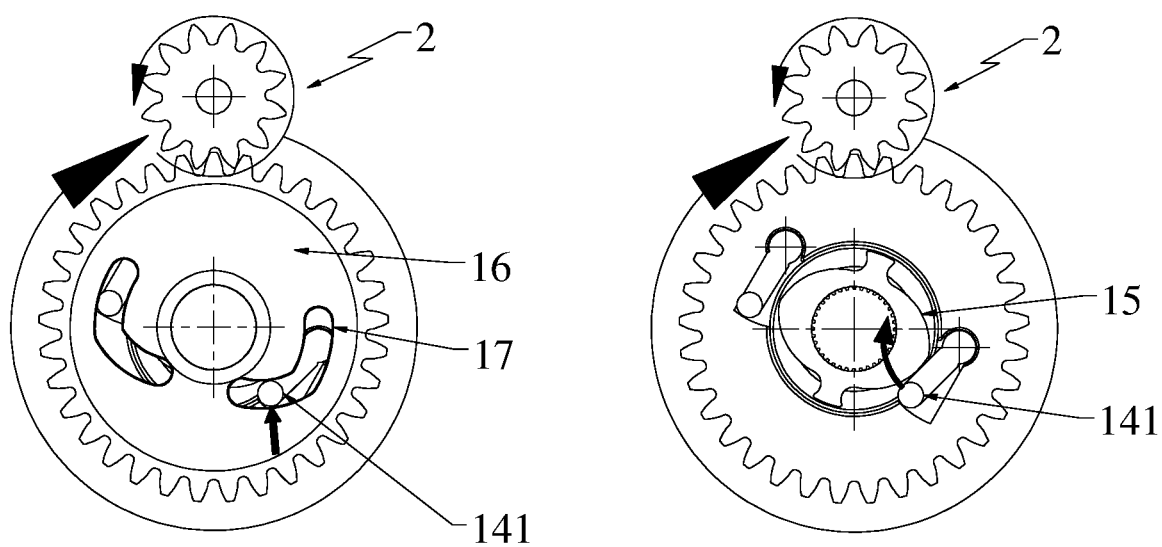
FIG. 13B illustrates, in the form of face-on views with the dog clutch controller (left-hand view) and without the dog-clutch controller (right-hand view), a clutch mechanism, said clutch mechanism being in the process of engaging the forwards-operation dog gear.
Figure 13C:
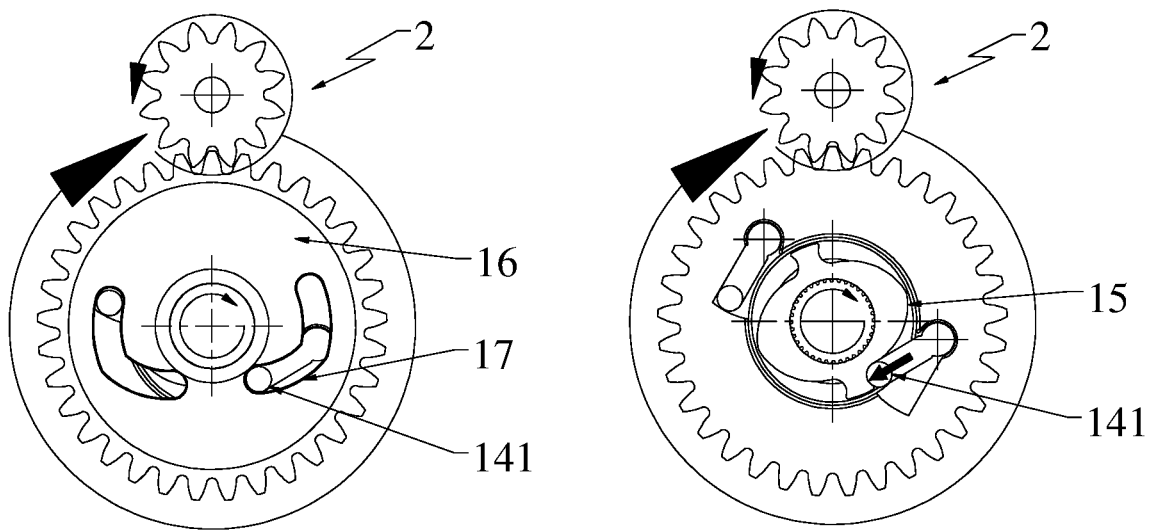
FIG. 13C illustrates, in the form of face-on views with the dog clutch controller (left-hand view) and without the dog-clutch controller (right-hand view), a clutch mechanism in the state in which the rotary drive member is driven in forwards running and in the engaged state of the forwards running dog gear of the clutch mechanism.

In practice, dog clutch engagement is performed as follows: in the disengaged state, the studs of the forwards running and reverse running dog gears are each positioned in a separated position of the fixed dog clutch element at the transition between the first and second parts of their guideway 17, as illustrated in FIG. 13A. When the rotary drive member 5 is rotationally driven in forwards running, the forwards running mobile dog gear 141 tends to move closer to the fixed dog clutch element 15 through movement of the stud of said dog gear in the second part of the guideway 17 formed on the dog clutch controller 16, which is braked. At the same time, the stud of the reverse running moving dog gear 142 moves along the first part of its guideway 17 formed on the dog clutch controller 16 and remains in a position separated from the fixed dog clutch element 15.

As the rotary drive member 5 continues to be driven in the forwards running rotationally driven direction, the stud of the forwards running moving dog gear 141 comes into contact with a radial projection 152 of the fixed dog clutch element 15 so that the fixed dog clutch element 15 and, consequently, the shaft 6 or shaft section that bears it and on which the fixed dog-clutch element 15 is mounted without the ability to rotate independently thereof, is rotationally driven in the forwards running direction.

The operation of the reverse running mobile dog gear is similar to that described hereinabove in respect of the forwards running mobile dog gear, with the rotary drive member 5 being driven in the reverse running direction.

In order to allow the clutch mechanism 4 to be disengaged, the clutch mechanism 4 comprises a declutching cam which is formed by the fixed dog clutch element 15. Specifically, the fixed dog clutch element 15 forms a declutching cam for declutching the forwards running moving dog gear 141 when the shaft 6 or shaft section with which the clutch mechanism collaborates is being rotationally driven in the forwards running direction when the rotational speed of the shaft 6 or of said shaft section 6A, 6B is greater than the rotational speed of the rotary drive member 5, and a declutching cam for declutching the reverse running mobile dog gear 142 with the shaft 6 or the shaft section with which the clutch mechanism collaborates being rotationally driven in the reverse running direction when the rotational speed of the shaft or of the shaft section is greater than the rotational speed of the rotary drive member 5.

Figure 13D:
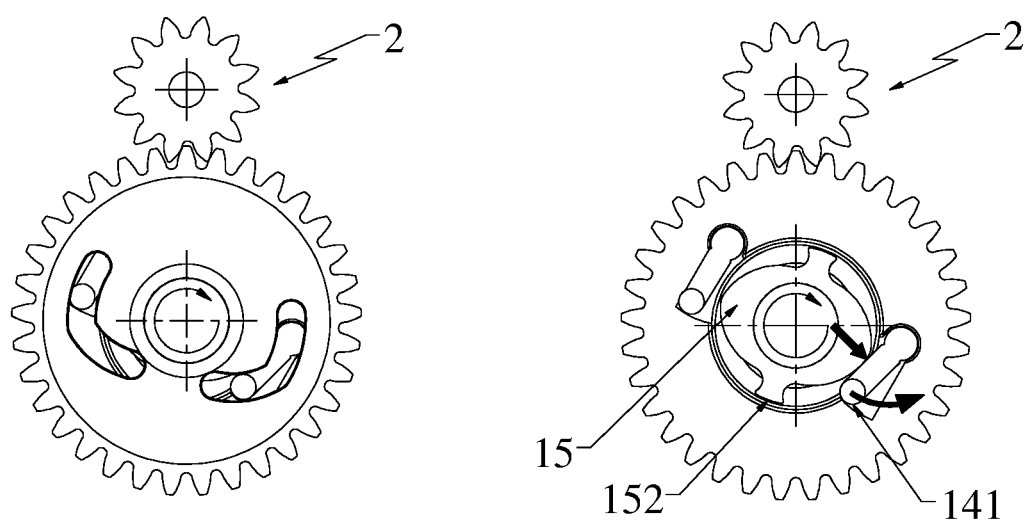
FIG. 13D illustrates, in the form of face-on views with the dog clutch controller (left-hand view) and without the dog-clutch controller (right-hand view), a clutch mechanism in the state in which the rotary drive member is driven in forwards running, said clutch mechanism being in the process of being disengaged.
Figure 13E:
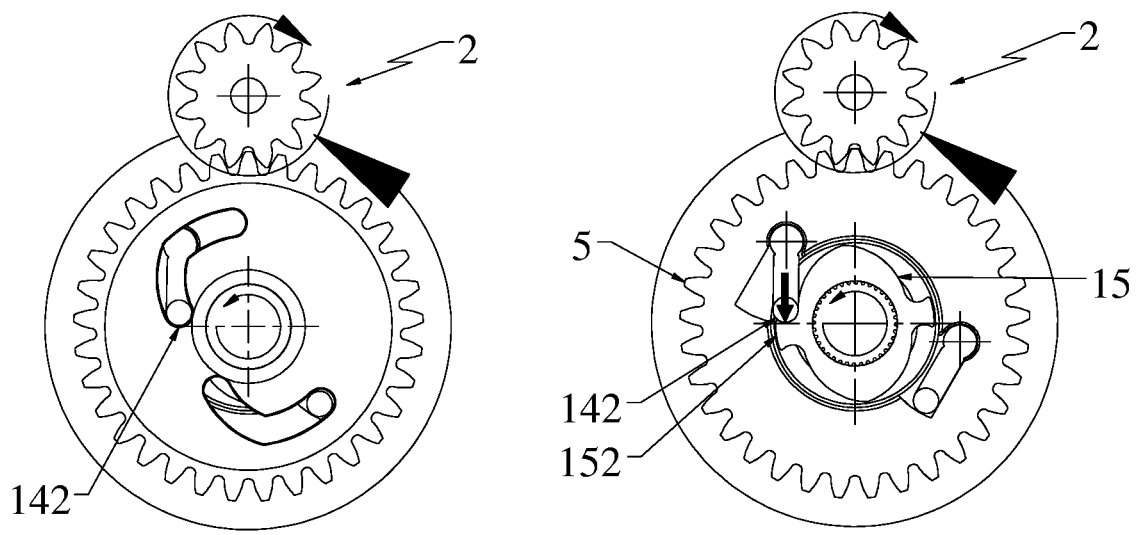
FIG. 13E illustrates, in the form of face-on views with the dog clutch controller (left-hand view) and without the dog-clutch controller (right-hand view), a clutch mechanism in the state in which the rotary drive member is driven in reverse running and in the engaged state of the reverse running dog gear of the clutch mechanism.

The declutching cam part of the fixed dog clutch element 15 is formed by the part of the external peripheral surface of the ring 151 that makes up the fixed dog clutch element 15 and that is formed between the external radial projections 152. It will thus be appreciated, as FIG. 13D illustrates, that when the shaft 6 or the shaft section bearing the fixed dog clutch element 15 is rotating faster in forwards running than the rotary drive member 5, the stud of the forwards running mobile dog gear comes into contact with the cam surface of the fixed dog clutch element 15 and is guided in its movement along the guideway 17 thereof in the direction of moving away from the fixed dog clutch element 15 as far as a position in which it lies at the transition between the first and second parts of its guideway 17 formed in the dog clutch controller 16. Once again, operation is similar for the reverse running mobile dog gear with the shaft 6 or the section of shaft bearing the dog clutch element 15 being driven in the reverse running direction at a speed higher than that of the rotary drive member 5.

To perfect said box, and independently of the embodiment of the or each clutch mechanism, the or each clutch mechanism is also, in the engaged state, configured to pass from the engaged state to the disengaged state as a result of a reversal of the direction of rotation of the rotary drive member 5 over a predetermined angular extent. This command to reverse the direction of rotation of the rotary drive member 5 over a predetermined angular extent can be achieved automatically using the motor rotational-drive control arranged on the handlebar, for example when said control is released. Thus, releasing the control on the handlebar allows the motor control unit to be sent automatically, via a switch or a sensor corresponding to the released position of the control, a signal commanding a reversal in the direction of the motor in order to cause the rotary drive member 5 to be driven in rotation in an opposite direction over a predetermined angular range with a view to returning the clutch mechanism to the disengaged state. Beyond this predetermined angular extent, continuing rotational drive of the rotary drive member 5 once again causes the clutch mechanism to pass from the disengaged state to the engaged state.

It must be noted that the box that at least partially houses the assembly of elements described hereinabove is generally made up of two half shells assembled along a parting face.

Likewise, it must be noted that when the shaft 6 is formed as a single piece and not of shaft sections, the transmission gearbox comprises just one clutch mechanism the operation of which is similar to that described in respect of a clutch mechanism fitted to one section of shaft.

In order to operate a vehicle equipped with a transmission gearbox of the type described hereinabove, the operator merely has to control the direction of drive, forwards running or reverse running, of the rotary drive member 5. Clutch engagement or disengagement then take place solely as a function of the relative speeds of the rotary drive member 5 and of the shaft 6 or shaft sections 6A, 6B.

The invention claimed is:

1. A transmission gearbox comprising:
    housed at least partially inside said box, an output shaft made as a single piece or as at least two coaxial shaft sections,
    a rotary drive member mounted free to rotate on said output shaft,
    a drive system for rotationally driving said rotary drive member in a first forwards running, rotationally driven direction and in a second reverse-running, rotationally driven direction and, positioned between the output shaft or each of the shaft sections and the rotary drive member, at least one clutch mechanism housed inside the transmission gearbox having a disengaged state and an engaged state, the output shaft or each shaft section being, when the at least one clutch mechanism is in the disengaged state, free to rotate in either one of its directions of rotation, the at least one clutch mechanism being configured so that, when the rotary drive member is rotationally driven in the first forwards-running rotationally driven direction, said clutch mechanism passes from the disengaged state to the engaged state when the rotational speed of said rotary drive member is greater than that of the output shaft or of said shaft sections with which the clutch mechanism is collaborating, and from the engaged state to the disengaged state by the rotational driving in forwards running of the output shaft or of the shaft sections with which the clutch mechanism collaborates, when the rotational speed of the output shaft or of said shaft sections is greater than the rotational speed of the rotary drive member, wherein said at least one clutch mechanism with two directions of operation and is also configured so that, when the rotary drive member is rotationally driven in the second reverse-running rotationally driven direction, said clutch mechanism passes from the disengaged state to the engaged state when the rotational speed of said rotary drive member is greater than that of the output shaft or of said shaft sections with which the clutch mechanism collaborates, and from the engaged state to the disengaged state by the reverse-running rotational driving of the output shaft or of the shaft sections with which the clutch mechanism collaborates when the rotational speed of the output shaft or of said shaft sections is greater than the rotational speed of the rotary drive member.

2. The transmission gearbox as claimed in claim 1, wherein said at least one clutch mechanism comprises a moving part able to move on the output shaft or the shaft sections between a disengaged position and an engaged position, said moving part that can be rotationally driven by the rotary drive member being configured to pass from the engaged position corresponding to the engaged state of the clutch mechanism to the disengaged position corresponding to the disengaged state of the clutch mechanism through bearing contact with the rotary drive member.

3. The transmission gearbox as claimed in claim 2, wherein the moving part of the clutch mechanism is configured to pass from the disengaged position to the engaged position through bearing contact with the rotary drive member.

4. The transmission gearbox as claimed in claim 2, wherein the moving part of the clutch mechanism is positioned between a fixed dog gear mounted to rotate as one with the output shaft or the shaft sections associated with the clutch mechanism, and a part of the rotary drive member, the moving part of the clutch mechanism able to move axially on said output shaft or said shaft sections between a position close to said fixed dog gear, corresponding to the engaged state of the clutch mechanism, and a position separated from the fixed dog gear, corresponding to the disengaged state of the clutch mechanism.

5. The transmission gearbox as claimed in claim 2, wherein the moving part of the clutch mechanism is a part that is permanently braked by a brake acting permanently on an angular speed of said moving part.

6. The transmission gearbox as claimed in claim 4, wherein the moving part of the clutch mechanism is a holed plate and in that the plate and the fixed dog gear are respectively equipped with teeth for rotationally coupling the plate and the fixed dog gear when the plate is in a state close to the fixed dog gear.

7. The transmission gearbox as claimed in claim 4, wherein the moving part of the clutch mechanism is a plate equipped with ramps which are configured to collaborate through bearing contact with complementary ramps formed on the rotary drive member so as to move the plate axially in the direction closer to or away from the fixed dog gear that rotates as one with the output shaft or the shaft sections associated with the clutch mechanism.

8. The transmission gearbox as claimed in claim 7, wherein the ramps of the plate and of the rotary drive member are each organized as a first and second series of ramps, with the ramps of one of the series active in forwards running and the ramps of the other series active in reverse running, these ramps of each series of ramps comprising a plurality of sets of ramps, each set of ramps or of a series of ramps or of the rotary drive member comprising at least two ramps or, these two ramps of the rotary drive member collaborating, in the case of one of said two ramps, with one of the ramps of a set of ramps of a series of ramps of the plate to move the plate axially in the direction closer to the fixed dog gear corresponding to the engaged position, and in the case of the other one of said two ramps with the other of the ramps of said set of ramps of a series of ramps of the plate to move the plate axially in the direction away from the fixed dog gear corresponding to the disengaged position.

9. The transmission gearbox as claimed in claim 8, wherein the ramps of a set of ramps of the first series of ramps of the plate form, with the ramps of a set of ramps of the second series of ramps of the plate, a lozenge shape, these ramps being helical ramps with the same helix pitch.

10. The transmission gearbox as claimed in claim 2, wherein the moving part of the at least one clutch mechanism and the rotary drive member are, for the purpose of rotationally driving the moving part by the rotary drive member, each equipped with teeth, each tooth of the moving part being mounted with clearance in the space between two teeth of the rotary drive member.

11. The transmission gearbox as claimed in claim 1, wherein said at least one clutch mechanism comprises two moving dog gears, a forward running mobile clucth dog and a reverse running mobile clutch dog, these moving dog gears being borne by the rotary drive member, a fixed dog clutch element fixed to rotate as one with the output shaft or the shaft sections bearing said clutch mechanism and a dog-clutch controller, said dog-clutch controller which is mounted, coaxially and with the freedom to rotate, on the output shaft or the shaft sections that bears said dog-clutch controller, being a part that is permanently braked by a brake acting permanently on the angular speed of said dog-clutch controller, the dog-clutch controller being equipped with a guideway for guiding the moving dog gears so as to allow each moving dog gear to pass selectively from a disengaged state to an engaged state in mesh with the fixed dog clutch element, said guideway of the dog clutch controller being configured to allow the forwards-running mobile clutch dog to pass to the engaged state, in the state in which the rotary drive member is rotationally driven in the forwards running, rotationally driven direction, when the rotational speed of said rotary drive member is greater than that of the output shaft or of said shaft sections with which the clutch mechanism collaborates, and allow the reverse-running mobile clutch dog to pass into the engaged state, in the state in which the rotary drive member is rotationally driven in the reverse-running, rotationally driven direction, when the rotational speed of said rotary drive member is greater than that of the output shaft or of said shaft section with which the clutch mechanism collaborates, the fixed dog-clutch element forming a de-clutching cam for disengaging the forwards-running mobile clutch dog in the state in which the output shaft or the shaft sections with which the clutch mechanism collaborates is rotationally driven in forwards running when the rotational speed of the output shaft or of said shaft sections is greater than the rotational speed of the rotary drive member, and a declutching cam for disengaging the reverse-running mobile clutch dog in the state in which the output shaft or the shaft sections with which the clutch mechanism collaborates is rotationally driven in reverse running when the rotational speed of the output shaft or of said shaft section is greater than the rotational speed of the rotary drive member.

12. The transmission gearbox as claimed in claim 11, wherein each moving clutch dog is a pivoting lever mounted with the ability to pivot about an axis parallel to the output shaft or to the shaft sections in order for said moving clutch dogs to pass from a disengaged state to an engaged state or vice versa.

13. The transmission gearbox as claimed in claim 12, said pivoting lever is provided with a stud positioned along or inside the guideway of the dog clutch controller, the stud being able to be positioned in bearing contact with the fixed dog clutch element.

14. The transmission gearbox as claimed in claim 11, wherein the fixed dog clutch element is a ring mounted to rotate as one with the output shaft or the shaft sections which bears said ring, said ring being equipped with at least two external radial projections, either one of said external radial projections forming an abutment against which one of the moving clutch dogs can bear when the clutch mechanism is in the engaged state, at least part of the external peripheral surface of the ring, which surface is created between said external radial projections, being configured to form the declutching-cam part of said fixed dog clutch element.

15. The transmission gearbox as claimed in claim 11, wherein the dog clutch controller is a plate type rotary part through which the output shaft or the shaft sections that bears said plate type rotary part passes, this plate type rotary part being equipped with at least one through slot forming the guideway of said dog clutch controller.

16. A self-propelled wheeled vehicle with an operator, comprising:
a primary drive shaft, wheels and a transmission gearbox that can be positioned between the primary drive shaft and the wheels of said vehicle, wherein the transmission gearbox is as claimed in claim 1.

* * * * *